(12) United States Patent
Gambetta et al.

(10) Patent No.: US 11,748,648 B2
(45) Date of Patent: Sep. 5, 2023

(54) QUANTUM PULSE OPTIMIZATION USING MACHINE LEARNING

(71) Applicant: International Business Machines Corporation, Armonk, NY (US)

(72) Inventors: Jay M. Gambetta, Yorktown Heights, NY (US); Ismael Faro Sertage, Chappaqua, NY (US); Paul Nation, Yorktown Heights, NY (US); Francisco Jose Martin Fernandez, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 966 days.

(21) Appl. No.: 16/458,586

(22) Filed: Jul. 1, 2019

(65) Prior Publication Data

US 2021/0004707 A1    Jan. 7, 2021

(51) Int. Cl.
*G06N 10/00* (2022.01)
*G06F 15/16* (2006.01)
*G06N 20/00* (2019.01)

(52) U.S. Cl.
CPC .............. *G06N 10/00* (2019.01); *G06F 15/16* (2013.01); *G06N 20/00* (2019.01)

(58) Field of Classification Search
CPC ........ G06N 10/00; G06N 10/20; G06N 20/00; G06N 99/00; G06F 15/16; G06F 9/52; G06F 9/30101; G06F 9/48; G06F 8/443; H03K 19/196; H03K 3/38

USPC .............................................. 706/62; 707/62
See application file for complete search history.

(56) References Cited

U.S. PATENT DOCUMENTS

| 10,176,433 | B2 * | 1/2019 | Hastings | G06N 99/00 |
| 10,223,643 | B1 * | 3/2019 | Bishop | G06N 10/00 |
| 10,332,023 | B2 * | 6/2019 | Mezzacapo | G06N 10/00 |
| 10,483,980 | B2 * | 11/2019 | Sete | G06N 10/00 |
| 10,622,978 | B1 * | 4/2020 | Debnath | H03K 19/195 |
| 10,797,684 | B1 * | 10/2020 | Benz | H03K 3/38 |
| 11,086,665 | B2 * | 8/2021 | Griffin | G06F 9/542 |

(Continued)

FOREIGN PATENT DOCUMENTS

| CN | 108415206 A | 8/2018 |
| CN | 109165744 A | 1/2019 |

OTHER PUBLICATIONS

Liu, et al. "Integrating machine learning to achieve an automatic parameter prediction for practical continuous-variable quantum key distribution", Physical Review A 97(2), 022316 DOI: 10.1103/PhysRevA.97.022316 (2018).

(Continued)

*Primary Examiner* — James N Fiorillo
(74) *Attorney, Agent, or Firm* — Amin, Turocy & Watson, LLP

(57) ABSTRACT

Techniques for facilitating quantum pulse optimization using machine learning are provided. In one example, a system includes a classical processor and a quantum processor. The classical processor employs a quantum pulse optimizer to generate a quantum pulse based on a machine learning technique associated with one or more quantum computing processes. The quantum processor executes a quantum computing process based on the quantum pulse.

20 Claims, 10 Drawing Sheets

(56) References Cited

U.S. PATENT DOCUMENTS

| | | | | |
|---|---|---|---|---|
| 2011/0173696 | A1* | 7/2011 | Dynes | H04L 9/0858 |
| | | | | 726/22 |
| 2013/0215421 | A1* | 8/2013 | Stoner | G01C 19/62 |
| | | | | 356/301 |
| 2018/0062838 | A1* | 3/2018 | Godfrey | H04B 10/70 |
| 2018/0260732 | A1* | 9/2018 | Bloom | H03K 19/195 |
| 2019/0042973 | A1* | 2/2019 | Zou | G06F 9/30101 |
| 2019/0095811 | A1* | 3/2019 | Antonio | G06N 10/00 |
| 2020/0125402 | A1* | 4/2020 | Griffin | G06F 9/5027 |
| 2020/0369517 | A1* | 11/2020 | Nam | B82Y 10/00 |
| 2021/0279631 | A1* | 9/2021 | Pichler | G06E 1/00 |
| 2021/0334081 | A1* | 10/2021 | Chong | G06F 9/4881 |
| 2022/0084085 | A1* | 3/2022 | Rigetti | G06Q 30/0283 |
| 2022/0164693 | A1* | 5/2022 | Tezak | G06N 10/20 |
| 2022/0321616 | A1* | 10/2022 | Chopdekar | H04L 65/403 |
| 2022/0358391 | A1* | 11/2022 | Johnson | G06N 10/80 |

OTHER PUBLICATIONS

Palittapongarnpim, et al. "Learning in quantum control: High-dimensional global optimization for noisy quantum dynamics", Neurocomputing 268 pp. 116-126 (2017).

Mel, et al., "The NIST Definition of Cloud Computing," Special Publication 800-145, Sep. 2011, 7 pages.

\* cited by examiner

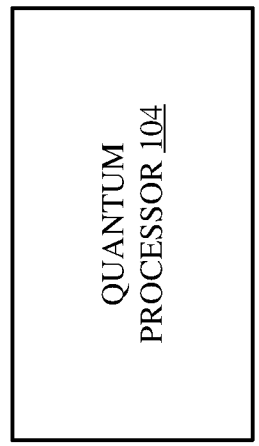
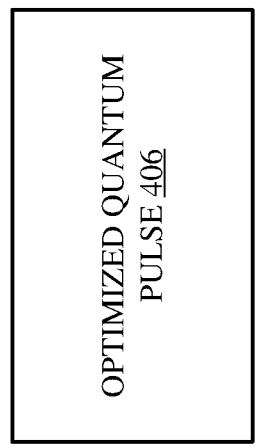
FIG. 5

QUANTUM PULSE OPTIMIZATION USING MACHINE LEARNING

BACKGROUND

The subject disclosure relates to quantum computing and, more specifically, to optimizing quantum pulses provided to a quantum computer.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products for facilitating quantum pulse optimization using machine learning are described.

According to an embodiment, a system can comprise a classical processor and a quantum processor. The classical processor can employ a quantum pulse optimizer to generate a quantum pulse based on a machine learning technique associated with one or more quantum computing processes. The quantum processor can execute a quantum computing process based on the quantum pulse.

According to another embodiment, a computer-implemented method is provided. The computer-implemented method can comprise optimizing, by a system operatively coupled to a processor, a quantum pulse based on a machine learning technique associated with one or more quantum computing processes to generate an optimized quantum pulse. The computer-implemented method can also comprise transmitting, by the system, the optimized quantum pulse to a quantum processor.

According to yet another embodiment, a computer program product for facilitating quantum pulse optimization using machine learning can comprise a computer readable storage medium having program instructions embodied therewith. The program instructions can be executable by a processor and cause the processor to optimize, by the processor, a quantum pulse based on a machine learning technique and historical data associated with one or more quantum computing processes to generate an optimized quantum pulse. The program instructions can also cause the processor to transmit, by the processor, the optimized quantum pulse to a quantum processor.

DESCRIPTION OF THE DRAWINGS

FIG. 5 illustrates an example, non-limiting system that includes quantum processor that employs an optimized quantum pulse in accordance with one or more embodiments described herein.

DETAILED DESCRIPTION

Figure 1:
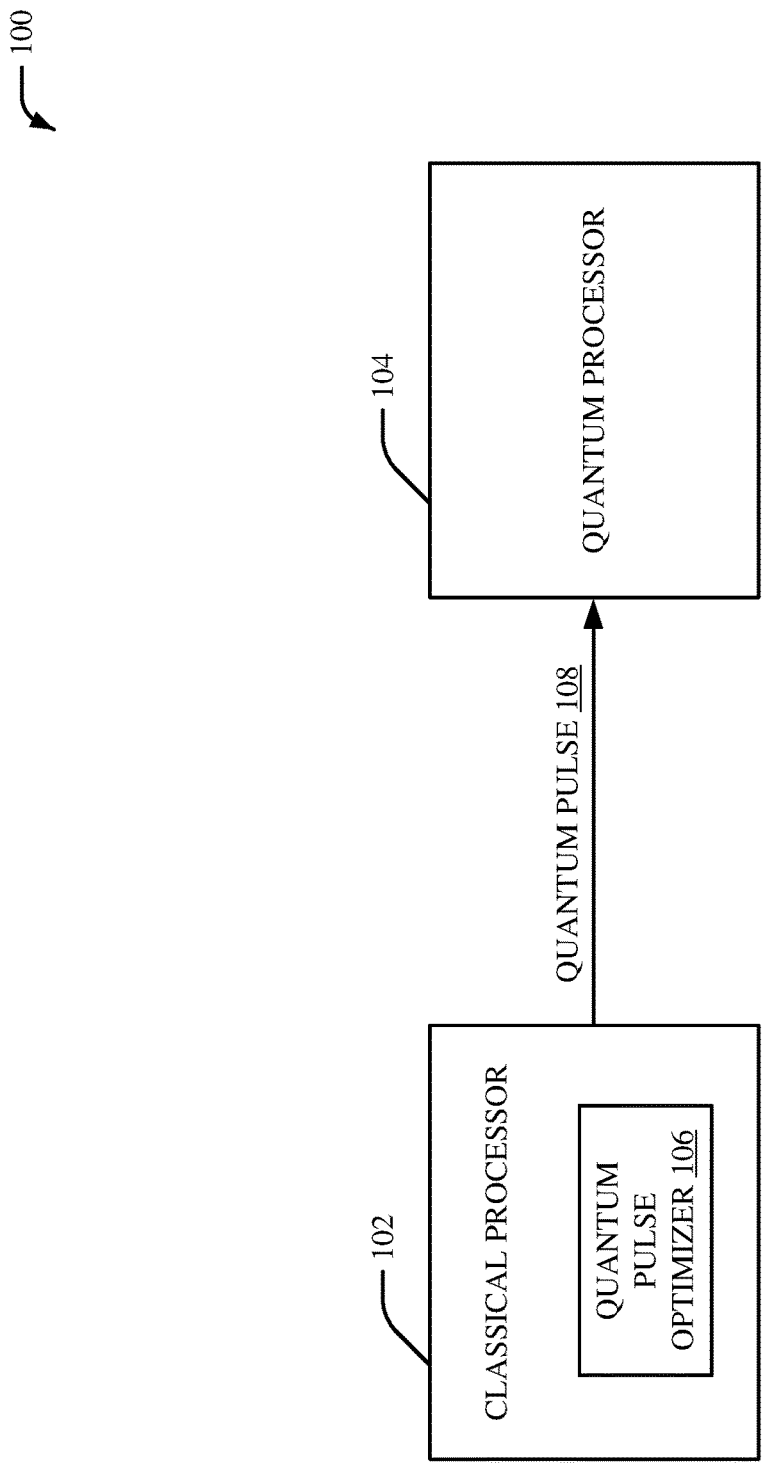
FIG. 1 illustrates an example, non-limiting system that facilitates quantum pulse optimization using machine learning in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Quantum computing employs quantum physics to encode information rather than binary digital techniques based on transistors. For example, a quantum computer is a device that employs quantum mechanical phenomena for computations and/or operations on data. In an aspect, a quantum computer can employ quantum bits (e.g., qubits) that operate according to a superposition principle of quantum physics and an entanglement principle of quantum physics. The superposition principle of quantum physics allows each qubit to represent both a value of "1" and a value of "0" at the same time. The entanglement principle of quantum physics states allows qubits in a superposition to be correlated with each other. For instance, a state of a first value (e.g., a value of "1" or a value of "0") can depend on a state of a second value. As such, a quantum computer can employ qubits to encode information rather than binary digital techniques based on transistors. Furthermore, a quantum computation by a quantum computer can employ quantum properties to represent and/or structure data. Quantum mechanisms can also be devices and/or built to perform operation with the data. To facilitate a quantum computation by a quantum computer, a quantum program (e.g., code that runs on a quantum computer) can be compiled into one or more quantum pulses to run in a quantum computer. A quantum pulse can encode data for interpretation by a quantum computer. A quantum pulse can also be provided as input to a quantum computer. However, quality of a quantum pulse provided to a quantum computer can directly impact execution of a quantum computer. Therefore, it is generally desirable to optimize a quantum pulse provided to a quantum computer.

To address these and/or other issues, embodiments described herein include systems, computer-implemented methods, and/or computer program products for facilitating quantum pulse optimization using machine learning. For example, a quantum pulse optimizer can be employed to improve inputs transmitted to a quantum computer. In an embodiment, one or more machine learning techniques can be employed to optimize a pulse generator that provides quantum pulses to a quantum computer. As such, quantum pulses can be optimized before being transmitted to a quantum computer. Performance of a quantum computer can also be maximized by optimizing quantum pulses for the quantum computer. In an aspect, the one or more machine learning techniques associated with the quantum pulse optimizer can predict an optimal pulse for a quantum program to run a quantum computer based on previous executions and/or knowledge associated with previous quantum programs. In certain embodiments, the one or more machine learning techniques associated with the quantum pulse optimizer can employ one or more classification techniques to detect patterns related to a quantum pulse and/or a quantum program. Additionally or alternatively, the one or more machine learning techniques associated with the quantum pulse optimizer can predict an optimal arrangement of quantum pulses for a quantum computer. Additionally or alternatively, the one or more machine learning techniques associated with the quantum pulse optimizer can employ reinforcement learning to provide repeated improvement of quality of quantum pulses for future optimizations of the quantum pulses. As such, a quantum pulse provided to a quantum computer can be improved and/or optimized. Furthermore, performance of a quantum computer can be improved. For instance, execution of a quantum program by a quantum computer can be improved. Moreover, processing performance of a quantum computer can be improved, processing efficiency of a quantum computer can be improved, processing characteristics a quantum computer can be improved, timing characteristics of a quantum computer can be improved and/or power efficiency of a quantum computer can be improved.

As disclosed herein, a classical processor (e.g., a classical computer, a classical circuit, etc.) can be a machine that processes data based on binary digits and/or transistors. Furthermore, a quantum processor (e.g., a quantum computer, a quantum circuit, etc.) as disclosed herein can be a machine that processes data based on quantum bits and/or quantum mechanical phenomena associated with superposition and/or entanglement.

FIG. 1 illustrates an example, non-limiting system 100 for facilitating quantum pulse optimization using machine learning in accordance with one or more embodiments described herein. In various embodiments, the system 100 can be a quantum computing system associated with technologies such as, but not limited to, quantum pulse technologies, quantum pulse generator technologies, quantum computing technologies, quantum programming technologies, quantum computer technologies, quantum chip technologies, quantum circuit technologies, quantum processor technologies, quantum device technologies, quantum simulation technologies, artificial intelligence technologies, machine learning technologies, network technologies, and/or other digital technologies. The system 100 can employ hardware and/or software to solve problems that are highly technical in nature, that are not abstract and that cannot be performed as a set of mental acts by a human. Further, in certain embodiments, some of the processes performed may be performed by one or more specialized computers (e.g., a quantum computer, one or more specialized processing units, a specialized computer with a quantum pulse optimizer, etc.) for carrying out defined tasks related to quantum computing and/or optimizing a quantum pulse. The system 100 and/or components of the system 100 can be employed to solve new problems that arise through advancements in technologies mentioned above, computer architecture, and/or the like. One or more embodiments of the system 100 can provide technical improvements to quantum pulse systems, quantum pulse generator systems, quantum computing systems, quantum programming systems, quantum computer systems, quantum chip systems, quantum circuit systems, quantum processor systems, quantum device systems, quantum simulation systems, artificial intelligence systems, machine learning systems, network systems, and/or other digital systems. One or more embodiments of the system 100 can also provide technical improvements to a quantum device (e.g., a quantum circuit, a quantum processor, a quantum computer, etc.) by improving processing performance of the quantum device, improving processing efficiency of the quantum device, improving processing characteristics of the quantum device, improving timing characteristics of the quantum device and/or improving power efficiency of the quantum device.

In the embodiment shown in FIG. 1, the system 100 can include a classical processor 102 and a quantum processor 104. Furthermore, the classical processor 102 can include a quantum pulse optimizer 106. The classical processor 102 can be communicatively coupled to the quantum processor 104. For example, the quantum pulse optimizer 106 of the classical processor 102 can be communicatively coupled to the quantum processor 104. The classical processor 102 can be a machine that performs a set of calculations based on binary digits and/or transistors. In an aspect, the classical processor 102 can employ one or more classical computation techniques via the quantum pulse optimizer 106 to facilitate optimization of a quantum pulse 108 provided to the quantum processor 104. The quantum processor 104 can be a machine that performs a set of calculations based on principle of quantum physics. For instance, the quantum processor 104 can perform one or more quantum computations associated with a set of quantum gates. Furthermore, the quantum processor 104 can encode information using qubits. In certain embodiments, the quantum processor 104 can perform one or more quantum computations associated with a sequence of quantum gates. In one embodiment, the quantum processor 104 can be a hardware quantum processor (e.g., a hardware superconducting quantum processor) that can encode and/or process information using qubits. For instance, the quantum processor 104 can be a hardware quantum processor that executes a set of instruction threads associated with qubits. In another embodiment, the quantum processor 104 can be associated with a quantum simulator that can simulate execution of a set of processing threads on the quantum processor 104. In certain embodiments, the quantum processor 104 can perform one or more quantum computations based on a machine-readable description of the quantum processor 104. For instance, the machine-readable description of the quantum processor 104 can textually describe one or more qubit gates of the quantum processor 104 associated with one or more qubits. In an aspect, the quantum processor 104 can perform one or more quantum computations based on the quantum pulse 108. For example, the quantum processor 104 can execute a quantum program associated with the quantum pulse 108. The quantum pulse 108 can be a microwave pulse that controls one or more quantum gates and/or one or more qubits of the quantum processor 104. For example, the quantum pulse 108 can be an electromagnetic pulse transmitted at a microwave frequency. The quantum pulse 108 can comprise, for example, a particular frequency and/or a particular phase to facilitate determination of an angle of rotation of a qubit state associated with the quantum processor 104. In certain embodiments, the classical processor 102 (e.g., the quantum pulse optimizer 106 of the classical processor 102) can convert a quantum program into the quantum pulse 108. For example, the classical processor 102 (e.g., the quantum pulse optimizer 106 of the classical processor 102) can convert quantum assembly language data into the quantum pulse 108.

In an embodiment, the quantum pulse optimizer 106 of the classical processor 102 can employ one or more machine learning techniques to optimize the quantum pulse 108 provided to the quantum processor 104. In an aspect, the quantum pulse optimizer 106 can employ machine learning and/or principles of artificial intelligence (e.g., one or more machine learning processes) to detect one or more patterns related to a quantum pulse and/or a quantum program associated with a quantum pulse. For example, the quantum pulse optimizer 106 can employ machine learning and/or principles of artificial intelligence (e.g., one or more machine learning processes) to detect one or more patterns related to the quantum pulse 108. The quantum pulse optimizer 106 can additionally or alternatively employ machine learning and/or principles of artificial intelligence (e.g., one or more machine learning processes) to detect one or more patterns related to a quantum program associated with the quantum pulse 108. Additionally or alternatively, the quantum pulse optimizer 106 can employ machine learning and/or principles of artificial intelligence (e.g., one or more machine learning processes) to detect one or more patterns related to one or more quantum pulses generated prior to the quantum pulse 108. Additionally or alternatively, the quantum pulse optimizer 106 can employ machine learning and/or principles of artificial intelligence (e.g., one or more machine learning processes) to detect one or more patterns related to one or more quantum programs associated with one or more quantum pulses generated prior to the quantum pulse 108. In certain embodiments, the quantum pulse optimizer 106 can employ machine learning and/or principles of artificial intelligence (e.g., one or more machine learning processes) to predict an optimal arrangement of quantum pulses for the quantum processor 104. For example, in certain embodiments, the quantum pulse 108 can be two or more quantum pulses transmitted to the quantum processor 104 in an optimal manner based on machine learning and/or principles of artificial intelligence (e.g., one or more machine learning processes) associated with the quantum pulse optimizer 106.

In another embodiment, the quantum pulse optimizer 106 can employ machine learning and/or principles of artificial intelligence (e.g., one or more machine learning processes) to generate the quantum pulse 108. The quantum pulse optimizer 106 can perform learning explicitly or implicitly with respect to learning one or more patterns, one or more inferences, one or more correlations, one or more features and/or information related to one or more quantum pulses and/or one or more quantum programs. In an aspect, the quantum pulse optimizer 106 can learn one or more patterns, one or more inferences, one or more correlations, one or more features and/or information related to one or more quantum pulses and/or one or more quantum programs based on classifications, correlations, inferences and/or expressions associated with principles of artificial intelligence. For instance, the quantum pulse optimizer 106 can employ an automatic classification system and/or an automatic classification process to learn one or more patterns, one or more inferences, one or more correlations, one or more features and/or information related to one or more quantum pulses and/or one or more quantum programs. In one example, the quantum pulse optimizer 106 can employ a probabilistic and/or statistical-based analysis (e.g., factoring into the analysis utilities and costs) to learn and/or generate inferences with respect to one or more quantum pulses and/or one or more quantum programs. In an aspect, the quantum pulse optimizer 106 can include an inference component (not shown) that can further enhance automated aspects of the quantum pulse optimizer 106 utilizing in part inference-based schemes to learn one or more patterns, one or more inferences, one or more correlations, one or more features and/or information related to one or more quantum pulses and/or one or more quantum programs.

The quantum pulse optimizer 106 can employ any suitable machine-learning based techniques, statistical-based techniques and/or probabilistic-based techniques. For example, the quantum pulse optimizer 106 can employ deep learning, expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the quantum pulse optimizer 106 can perform a set of machine learning computations associated with learning one or more patterns, one or more inferences, one or more correlations, one or more features and/or information related to one or more quantum pulses and/or one or more quantum programs. For example, the quantum pulse optimizer 106 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more patterns, one or more inferences, one or more correlations, one or more features and/or information related to one or more quantum pulses and/or one or more quantum programs.

It is to be appreciated that the quantum pulse optimizer 106 performs a quantum computing optimization process that cannot be performed by a human (e.g., is greater than the capability of a single human mind). For example, an amount of data processed, a speed of data processed and/or data types of data processed by the quantum pulse optimizer 106 over a certain period of time can be greater, faster and different than an amount, a speed and data types that can be processed by a single human mind over the same period of time. The quantum pulse optimizer 106 can also be fully operational towards performing one or more other functions (e.g., fully powered on, fully executed, etc.) while also performing the above-referenced quantum computing process and/or quantum post-process process. Additionally, the quantum pulse 108 generated by the quantum pulse optimizer 106 can include information that is impossible to obtain manually by a user. For example, a type of information included in the quantum pulse 108, a variety of information included in the quantum pulse 108, and/or an amount of information included in the quantum pulse 108 can be more complex than information obtained manually by a user. Moreover, it is to be appreciated that the quantum processor 104 performs a quantum computing process that cannot be performed by a human (e.g., is greater than the capability of a single human mind). For example, an amount of data processed, a speed of data processed and/or a type of data processed by the quantum processor 104 over a certain period of time can be greater, faster and different than an amount, a speed and data types that can be processed by a single human mind over the same period of time. Additionally, it is to be appreciated that the system 100 can provide various advantages as compared to conventional quantum computing systems. For instance, quality of the quantum pulse 108 can be improved by employing the system 100. Performance, efficiency and/or efficacy of the quantum processor 104 can also be improved by employing the system 100. Furthermore, accuracy of a quantum computing process, efficiency of a quantum computing process, efficacy of a quantum computing process, an amount of time to perform a quantum computing process, an amount of processing performed by a quantum computing process, and/or an amount of storage utilized by a quantum computing process can be reduced by employing the system 100.

Figure 2:
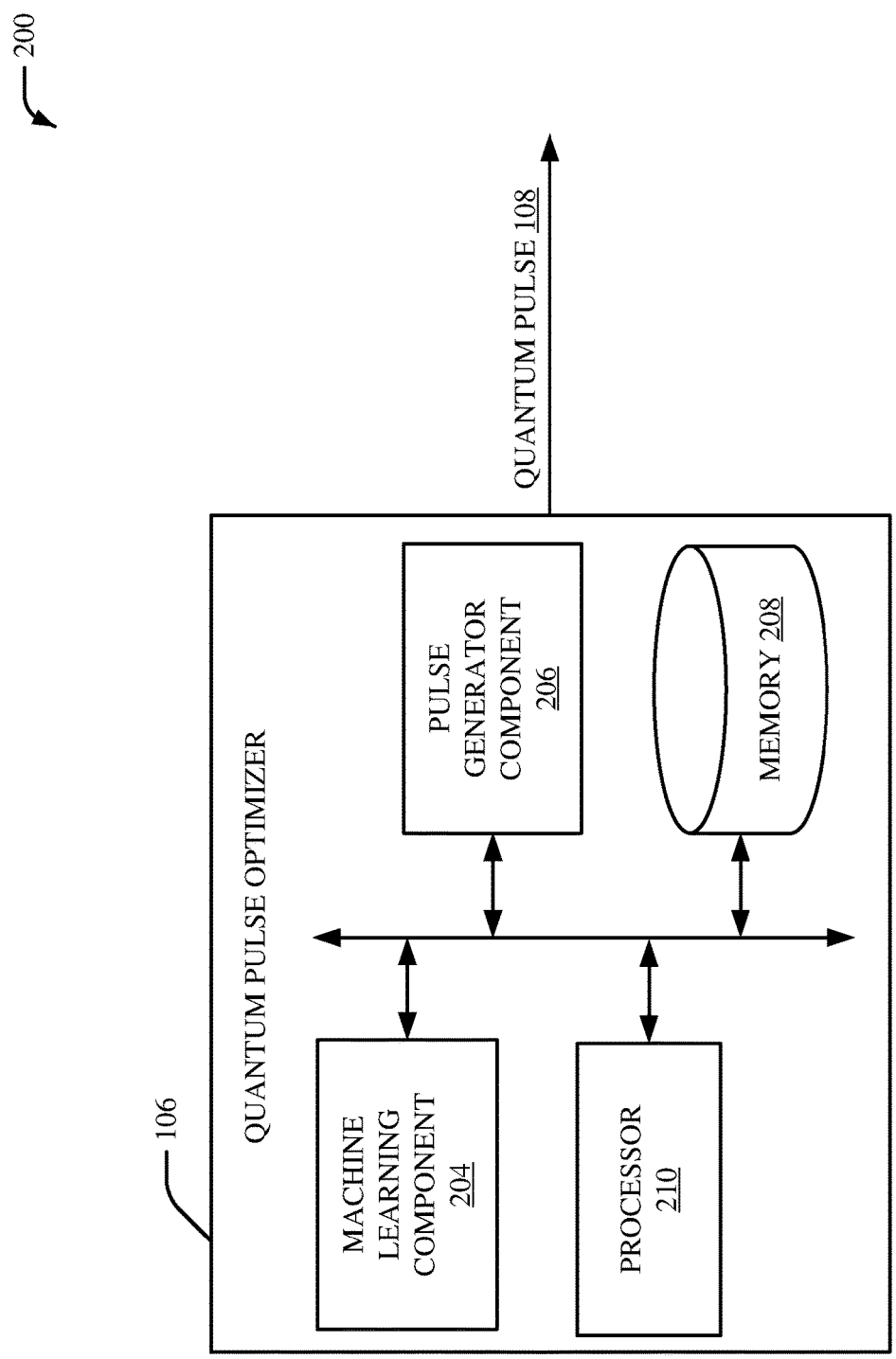
FIG. 2 illustrates a block diagram of an example, non-limiting system that includes a quantum pulse optimizer in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

In the embodiment shown in FIG. 2, the system 200 can include the quantum pulse optimizer 106. As shown in FIG. 2, in an embodiment, the quantum pulse optimizer 106 can include a machine learning component 204 and a pulse generator component 206. Aspects of the quantum pulse optimizer 106 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the quantum pulse optimizer 106 can also include memory 208 that stores computer executable components and instructions. Furthermore, in certain embodiments, the quantum pulse optimizer 106 can include a processor 210 to facilitate execution of the instructions (e.g., computer executable components and corresponding instructions) by the quantum pulse optimizer 106. As shown, the machine learning component 204, the pulse generator component 206, the memory 208 and/or the processor 210 can be electrically and/or communicatively coupled to one another in one or more embodiments.

The machine learning component 204 can perform one or more machine learning techniques to facilitate optimization of the quantum pulse 108 generated by the pulse generator component 206. In an embodiment, the machine learning component 204 can perform one or more machine learning techniques based on historical data associated with one or more quantum computing processes (e.g., one or more previously performed quantum computing processes). For example, the historical data can include information related to one or more previously generated quantum pulses provided to the quantum processor 104. Additionally or alternatively, the historical data can include information related to one or more quantum programs previously executed by the quantum processor 104. In an aspect, the machine learning component 204 can detect one or more patterns in the one or more previously generated quantum pulses provided to the quantum processor 104. Additionally or alternatively, the machine learning component 204 can detect one or more patterns in the one or more quantum programs previously executed by the quantum processor 104.

In certain embodiments, the machine learning component 204 can compare a pattern for a quantum program to one or more previously generated quantum programs. In response to a determination by the machine learning component 204 that the quantum program matches a previously generated quantum program from the one or more previously generated quantum programs, the pulse generator component 206 can employ at least a portion of a compilation associated with the previously generated quantum program for the quantum pulse 108. For example, in response to a determination by the machine learning component 204 that the quantum program matches a previously generated quantum program from the one or more previously generated quantum programs, the pulse generator component 206 can employ at least a portion of a previous quantum pulse for the quantum pulse 108. In another example, in response to a determination by the machine learning component 204 that the quantum program matches a previously generated quantum program from the one or more previously generated quantum programs, the pulse generator component 206 can modify one or more portions of the quantum program based on results of the machine learning. In certain embodiments, the machine learning component 204 can perform two or more different machine learning techniques to facilitate generation of the quantum pulse 108 by the pulse generator component 206. The machine learning component 204 can also rank results from the two or more different machine learning techniques to facilitate generation of the quantum pulse 108 by the pulse generator component 206. In certain embodiments, the machine learning component 204 can determine an arrangement of quantum pulses generated by the pulse generator component 206. For example, the machine learning component 204 can determine an order of transmission of the quantum pulse 108 with respect to one or more other quantum pulses generated by the pulse generator component 206. The pulse generator component 206 can generate one or more quantum pulses such as, for example, the quantum pulse 108. Furthermore, the pulse generator component 206 can transmit, for example, one or more quantum pulses to the quantum processor 104. In an example, the pulse generator component 206 can transmit the quantum pulse 108 to the quantum processor 104.

In certain embodiments, the machine learning component 204 can employ one or more machine learning techniques to optimize the quantum pulse 108 generated by the pulse generator component 206. In an aspect, the machine learning component 204 can employ machine learning and/or principles of artificial intelligence (e.g., one or more machine learning processes) to detect one or more patterns related to a quantum pulse and/or a quantum program associated with a quantum pulse. For example, the machine learning component 204 can employ machine learning and/or principles of artificial intelligence (e.g., one or more machine learning processes) to detect one or more patterns related to the quantum pulse 108. The machine learning component 204 can additionally or alternatively employ machine learning and/or principles of artificial intelligence (e.g., one or more machine learning processes) to detect one or more patterns related to a quantum program associated with the quantum pulse 108. Additionally or alternatively, the machine learning component 204 can employ machine learning and/or principles of artificial intelligence (e.g., one or more machine learning processes) to detect one or more patterns related to one or more quantum pulses generated prior to the quantum pulse 108. Additionally or alternatively, the machine learning component 204 can employ machine learning and/or principles of artificial intelligence (e.g., one or more machine learning processes) to detect one or more patterns related to one or more quantum programs associated with one or more quantum pulses generated prior to the quantum pulse 108. In certain embodiments, the quantum pulse optimizer 106 can employ machine learning and/or principles of artificial intelligence (e.g., one or more machine learning processes) to predict an optimal arrangement of quantum pulses generated by the pulse generator component 206. For example, in certain embodiments, the quantum pulse 108 can be two or more quantum pulses transmitted to the quantum processor 104 in an optimal manner by the pulse generator component 206 based on machine learning and/or principles of artificial intelligence (e.g., one or more machine learning processes) associated with the machine learning component 204.

In an embodiment, the machine learning component 204 can employ machine learning and/or principles of artificial intelligence (e.g., one or more machine learning processes) to generate the quantum pulse 108. The machine learning component 204 can perform learning explicitly or implicitly with respect to learning one or more patterns, one or more inferences, one or more correlations, one or more features and/or information related to one or more quantum pulses and/or one or more quantum programs. In an aspect, the machine learning component 204 can learn one or more patterns, one or more inferences, one or more correlations, one or more features and/or information related to one or more quantum pulses and/or one or more quantum programs based on classifications, correlations, inferences and/or expressions associated with principles of artificial intelligence. For instance, the machine learning component 204 can employ an automatic classification system and/or an automatic classification process to learn one or more patterns, one or more inferences, one or more correlations, one or more features and/or information related to one or more quantum pulses and/or one or more quantum programs. In one example, the machine learning component 204 can employ a probabilistic and/or statistical-based analysis (e.g., factoring into the analysis utilities and costs) to learn and/or generate inferences with respect to one or more quantum pulses and/or one or more quantum programs. In an aspect, the machine learning component 204 can include an inference component (not shown) that can further enhance automated aspects of the machine learning component 204 utilizing in part inference-based schemes to learn one or more patterns, one or more inferences, one or more correlations, one or more features and/or information related to one or more quantum pulses and/or one or more quantum programs.

The machine learning component 204 can employ any suitable machine-learning based techniques, statistical-based techniques and/or probabilistic-based techniques. For example, the machine learning component 204 can employ deep learning, expert systems, fuzzy logic, SVMs, HMMs, greedy search algorithms, rule-based systems, Bayesian models (e.g., Bayesian networks), neural networks, other non-linear training techniques, data fusion, utility-based analytical systems, systems employing Bayesian models, etc. In another aspect, the machine learning component 204 can perform a set of machine learning computations associated with learning one or more patterns, one or more inferences, one or more correlations, one or more features and/or information related to one or more quantum pulses and/or one or more quantum programs. For example, the machine learning component 204 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more patterns, one or more inferences, one or more correlations, one or more features and/or information related to one or more quantum pulses and/or one or more quantum programs. In an aspect, the pulse generator component 206 can generate the quantum pulse 108 based on learned data associated with the one or more machine learning techniques performed by the machine learning component 204. For example, the learned data can include information associated with one or more patterns, one or more inferences, one or more correlations, one or more features and/or information related to one or more quantum pulses and/or one or more quantum programs.

Figure 3:
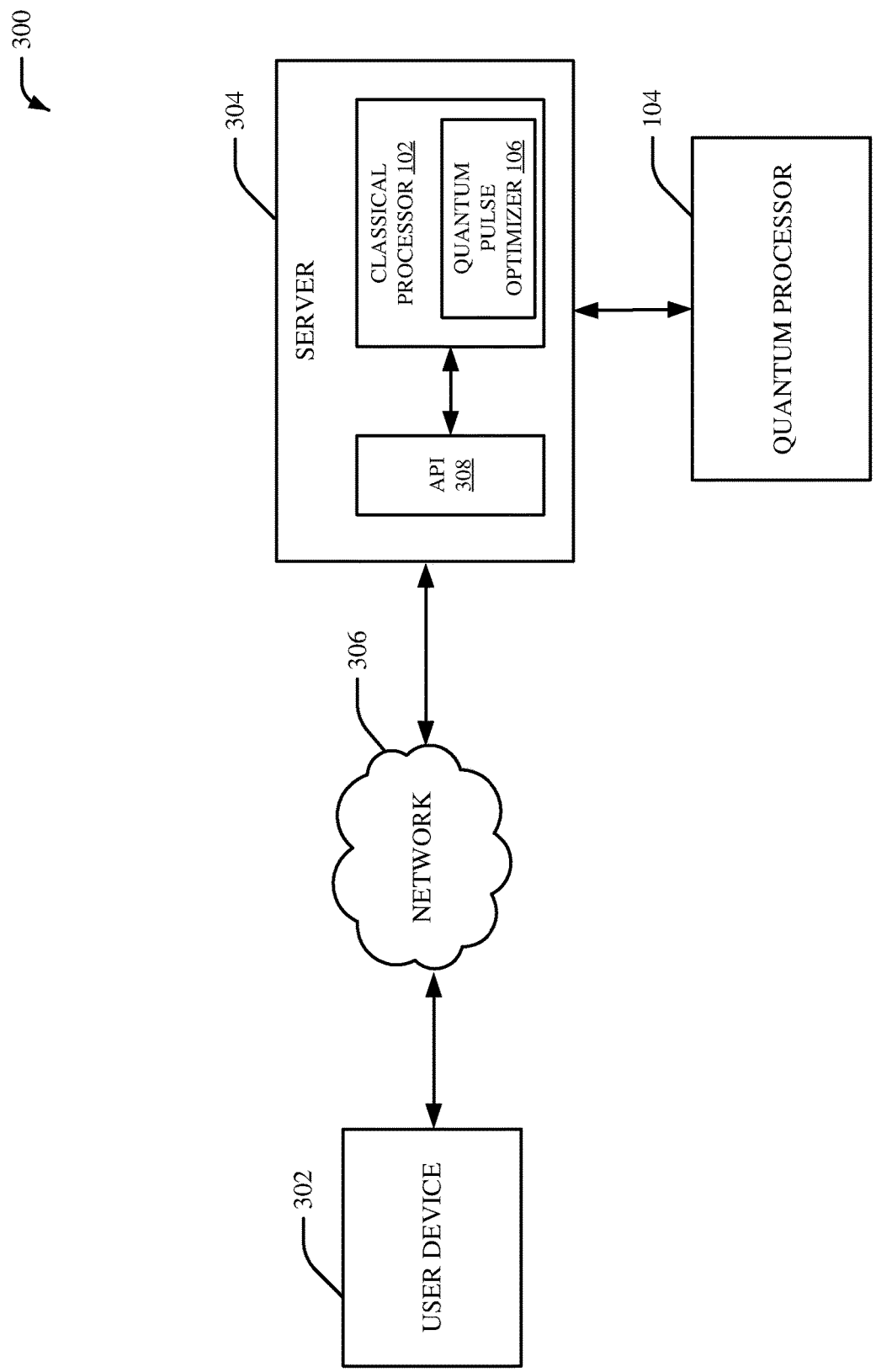
FIG. 3 illustrates another example, non-limiting system that facilitates quantum pulse optimization using machine learning in accordance with one or more embodiments described herein.

FIG. 3 illustrates an example, non-limiting system 300 in accordance with one or more embodiments described herein. Repetitive description of like elements employed in other embodiments described herein is omitted for sake of brevity.

The system 300 includes the quantum processor 104, a user device 302 and/or a server 304. The server 304 can include the classical processor 102. The classical processor 102 can include the quantum pulse optimizer 106. In an embodiment, the quantum pulse optimizer 106 can include the machine learning component 204, the pulse generator component 206, the memory 208 and/or the processor 210. The quantum processor 104 can be communicatively coupled to the server 304. For example, the quantum processor 104 can be communicatively coupled to the classical processor 102 (e.g., the quantum pulse optimizer 106) of the server 304. In an embodiment, the system 300 can be a network environment (e.g., a computing network). For instance, the system 300 can be a cloud computing environment. The user device 302 can be configured to interact with a user (e.g., a user identity). The user device 302 can be, for example, an electronic device, a display device, a desktop computer, a laptop computer, a smart device, a smart phone, a mobile device, a handheld device, a tablet device, a virtual reality device, a portable computing device, or another user device associated with a display. In certain embodiments, the user device 302 can be communicatively coupled to the server 304 via a network 306. For example, the user device 302 can be communicatively coupled to the classical processor 102 (e.g., the quantum pulse optimizer 106) of the server 304 via a network 306. The network 306 can be a communication network, a wireless network, a wired network, an internet protocol (IP) network, a voice over IP network, an internet telephony network, a mobile telecommunications network or another type of network. In certain embodiments, the user device 302 can be communicatively coupled to an application programming interface (API) 308 of the server 304 via a network 306. The API 308 can be communicatively coupled to the classical processor 102 (e.g., the quantum pulse optimizer 106 of the classical processor 102).

In a non-limiting embodiment, a user (e.g., a user identity) associated with the user device 302 can compose a quantum program using, for example, a programming language. The quantum program can be transmitted to the server 304 via the network 306. For example, the API 308 of the server 304 can obtain the quantum program from the user device 302 via the network 306. The classical processor 102 can, for example, obtain the quantum program via the API 308. Furthermore, the classical processor 102 can transform and/or compile the quantum program into a quantum assembly language. The quantum assembly language can be converted and/or optimized into a quantum pulse (e.g., the quantum pulse 108) for the quantum processor 104. For example, the server 304 (e.g., the classical processor 102 of the server 304) can transmit an optimized version of a quantum pulse (e.g., the quantum pulse 108) associated with the quantum program to the quantum processor 104.

Figure 4:
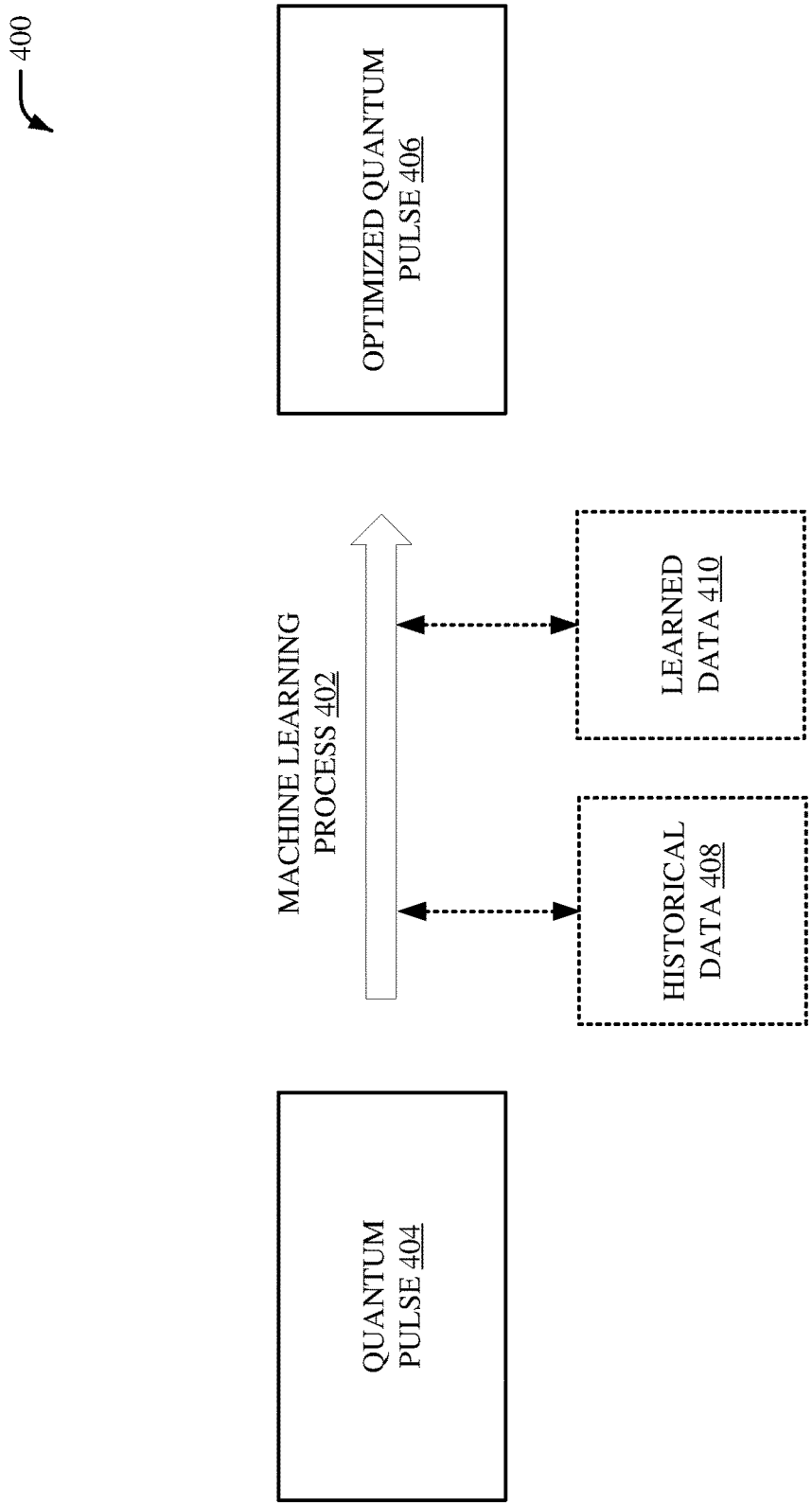
FIG. 4 illustrates an example, non-limiting system that includes a machine learning process for facilitating quantum pulse optimization in accordance with one or more embodiments described herein.

FIG. 4 illustrates an example, non-limiting system 400 in accordance with one or more embodiments described herein. Repetitive description of like elements employed in other embodiments described herein is omitted for sake of brevity.

The system 400 includes a machine learning process 402 to facilitate converting a quantum pulse 404 into an optimized quantum pulse 406. The optimized quantum pulse 406 can be an optimized version of the quantum pulse 404. For example, the optimized quantum pulse 406 can comprise less error and/or less noise than the quantum pulse 404. In an embodiment, the quantum pulse 108 can correspond to the optimized quantum pulse 406. In another embodiment, the machine learning process 402 can be a machine learning process performed by the quantum pulse optimizer 106. For example, the machine learning process 402 can be a machine learning process performed by the machine learning component 204. The quantum pulse 404 can be, for example, a microwave pulse that can control one or more quantum gates and/or one or more qubits of a quantum processor (e.g., the quantum processor 104). For instance, the quantum pulse 404 can be an electromagnetic pulse associated with a particular microwave frequency. The quantum pulse 404 can comprise, for example, a particular frequency and/or a particular phase to facilitate determination of an angle of rotation of a qubit state associated with a quantum processor (e.g., the quantum processor 104). In an embodiment, the machine learning process 402 can convert the quantum pulse 404 into the optimized quantum pulse 406 based on historical data 408. Additionally or alternatively, the machine learning process 402 can convert the quantum pulse 404 into the optimized quantum pulse 406 based on learned data 410. The optimized quantum pulse 406 can be, for example, an optimized microwave pulse to optimally control one or more quantum gates and/or one or more qubits of a quantum processor (e.g., the quantum processor 104). For instance, the optimized quantum pulse 406 can be an optimized electromagnetic pulse associated with a particular microwave frequency. The optimized quantum pulse 406 can comprise, for example, a modified frequency and/or a modified phase as compared to the quantum pulse 404 to facilitate optimized determination of an angle of rotation of a qubit state associated with a quantum processor (e.g., the quantum processor 104).

In an embodiment, the historical data 408 can include data associated with one or more quantum computing processes (e.g., one or more previously performed quantum computing processes) performed by the quantum processor 104 and/or one or more other quantum processors. In an aspect, the historical data 408 can include data related to one or more inputs provided to the quantum processor 104 for one or more quantum computing processes. Additionally or alternatively, the historical data 408 can include data related to one or more outputs provided by the quantum processor 104 for one or more quantum computing processes. In certain embodiments, the historical data 408 can include data related to historical qubit values of the quantum processor 104 for one or more quantum computing processes. The historical data 408 can additionally or alternatively include data related to one or more previously generated quantum pulses provided to the quantum processor 104. Additionally or alternatively, the historical data 408 can include information related to one or more quantum programs previously executed by the quantum processor 104. The learned data 410 can include data related to one or more machine learning processes performed by the quantum pulse optimizer 106. For example, in certain embodiments, the learned data 410 can be generated by the machine learning process 402. In certain embodiments, the learned data 410 can be generated based on machine learning and/or knowledge associated with the historical data 408. Additionally or alternatively, the learned data 410 can include knowledge related to results generated by machine learning associated with the quantum pulse optimizer 106. Additionally or alternatively, the learned data 410 can include knowledge related to results generated by machine learning associated with the quantum processor 104. In an embodiment, the learned data 410 can include one or more patterns associated with one or more previously generated quantum pulses provided to the quantum processor 104. Additionally or alternatively, the learned data 410 can include one or more patterns associated with one or more quantum programs previously executed by the quantum processor 104. In certain embodiments, the learned data 410 can include data related to previous optimal arrangements of quantum pulses for the quantum processor 104. In certain embodiments, the learned data 410 can include a machine learning model associated with the historical data 408, the quantum pulse optimizer 106 and/or the quantum processor 104. For example, in certain embodiments, the learned data 410 can include a learning algorithm generated based on one or more previously executed machine learning processes associated with the historical data 408, the quantum pulse optimizer 106 and/or the quantum processor 104.

FIG. 5 illustrates an example, non-limiting system 500 in accordance with one or more embodiments described herein. Repetitive description of like elements employed in other embodiments described herein is omitted for sake of brevity.

The system 500 includes the optimized quantum pulse 406 and the quantum processor 104. The optimized quantum pulse 406 can be provided as input for the quantum processor 104. For example, the quantum processor 104 can perform one or more quantum computations based on the optimized quantum pulse 406. In an embodiment, the optimized quantum pulse 406 can be, for example, an optimized microwave pulse to optimally control one or more quantum gates and/or one or more qubits of the quantum processor 104. For instance, the optimized quantum pulse 406 can be an optimized electromagnetic pulse associated with a particular microwave frequency. The optimized quantum pulse 406 can comprise, for example, a modified frequency and/or a modified phase as compared to the quantum pulse 404 to facilitate optimized determination of an angle of rotation of a qubit state associated with the quantum processor 104. As such, performance, efficiency and/or efficacy of the quantum processor 104 can be improved by employing the optimized quantum pulse 406. Furthermore, accuracy of one or more quantum computations performed by the quantum processor 104 can be improved, efficiency of one or more quantum computations performed by the quantum processor 104 can be improved, an amount of time to perform one or more quantum computations performed by the quantum processor 104 can be reduced, and/or an amount of processing performed by the quantum processor 104 can be reduced by employing the optimized quantum pulse 406.

Figure 6:
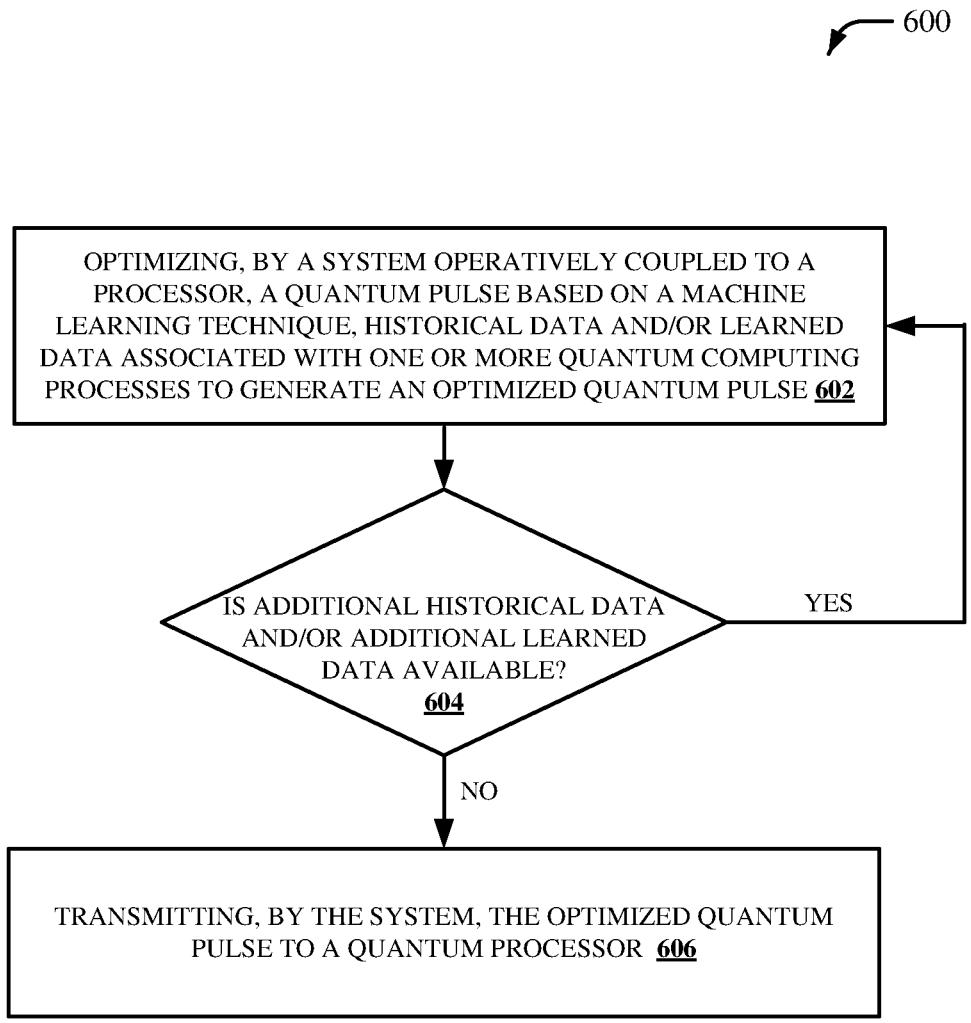
FIG. 6 illustrates a flow diagram of an example, non-limiting computer-implemented method for facilitating quantum pulse optimization using machine learning in accordance with one or more embodiments described herein.

FIG. 6 illustrates a flow diagram of an example, non-limiting computer-implemented method 600 for facilitating quantum pulse optimization using machine learning in accordance with one or more embodiments described herein. At 602, a quantum pulse is optimized, by a system operatively coupled to a processor (e.g., by machine learning component 204), based on a machine learning technique, historical data and/or learned data associated with one or more quantum computing processes to generate an optimized quantum pulse. For example, the machine learning technique can be one or more machine learning techniques to facilitate converting a quantum pulse associated with a quantum program into the optimized quantum pulse. The optimized quantum pulse can be an optimized version of a quantum pulse associated with a quantum program. For example, the optimized quantum pulse can comprise less error and/or less noise than the quantum pulse associated with the quantum program. In an embodiment, the machine learning technique can employ machine learning and/or principles of artificial intelligence to generate the optimized quantum pulse. For example, in certain embodiments, the machine learning technique can be performed based on the historical data. Additionally or alternatively, the machine learning technique can generate the learned data. In an aspect, the machine learning technique can learn one or more patterns, one or more inferences, one or more correlations, one or more features and/or information related to one or more quantum pulses and/or one or more quantum programs based on classifications, correlations, inferences and/or expressions associated with principles of artificial intelligence. For example, the quantum pulse can be optimized based on one or more patterns associated with the one or more quantum computing processes. Additionally or alternatively, the quantum pulse can be optimized based on one or more patterns associated with quantum pulses employed by the one or more quantum computing processes. Additionally or alternatively, the quantum pulse can be optimized based on an arrangement of quantum pulses associated with the one or more quantum computing processes. As such, the quantum pulse can be optimized based on the machine learning technique, the historical data and/or the learned data. The optimized quantum pulse can be, for example, an optimized microwave pulse to optimally control one or more quantum gates and/or one or more qubits of a quantum processor. For instance, the optimized quantum pulse can be an optimized electromagnetic pulse associated with a particular microwave frequency. The optimized quantum pulse can comprise, for example, a modified frequency and/or a modified phase as compared to the quantum pulse associated with the quantum program to facilitate optimized determination of an angle of rotation of a qubit state associated with a quantum processor.

The historical data can include data associated with one or more quantum computing processes (e.g., one or more previously performed quantum computing processes) performed by one or more other quantum processors. In an aspect, the historical data can include data related to one or more inputs provided to a quantum processor for one or more quantum computing processes. Additionally or alternatively, the historical data can include data related to one or more outputs provided by a quantum processor for one or more quantum computing processes. In certain embodiments, the historical data can include data related to historical qubit values of a quantum processor for one or more quantum computing processes. The historical data can additionally or alternatively include data related to one or more previously generated quantum pulses provided to a quantum processor. Additionally or alternatively, the historical data can include information related to one or more quantum programs previously executed by a quantum processor. The learned data can include data related to one or more machine learning processes performed by a classical processor. For example, the learned data can be generated based on machine learning and/or knowledge associated with the historical data. Additionally or alternatively, the learned data can include knowledge related to results generated by machine learning associated with a classical processor. Additionally or alternatively, the learned data can include knowledge related to results generated by machine learning associated with one or more quantum computations performed by a quantum processor. In an embodiment, the learned data can include one or more patterns associated with one or more previously generated quantum pulses provided to a quantum processor. Additionally or alternatively, the learned data can include one or more patterns associated with one or more quantum programs previously executed by a quantum processor. In certain embodiments, the learned data can include data related to previous optimal arrangements of quantum pulses for a quantum processor. In certain embodiments, the learned data can include a machine learning model associated with the historical data, a classical processor and/or a quantum processor. For example, in certain embodiments, the learned data can include a learning algorithm generated based on one or more previously executed machine learning processes associated with the historical data, a classical processor and/or a quantum processor.

At 604, it is determined whether additional historical data and/or additional learned data is available. If yes, the computer-implemented method 600 returns to 602. If no, the computer-implemented method 600 proceeds to 606.

At 606, the optimized quantum pulse is transmitted, by the system (e.g., by pulse generator component 206), to a quantum processor. For example, the optimized quantum pulse can be provided as input to the quantum processor. The quantum processor can be a machine that performs a set of calculations based on principle of quantum physics. For instance, the quantum processor can perform one or more quantum computations associated with a set of quantum gates based on the optimized quantum pulse. Furthermore, the quantum processor can encode information using qubits based on the optimized quantum pulse. In certain embodiments, the quantum processor can perform one or more quantum computations associated with a sequence of quantum gates based on the optimized quantum pulse. In one embodiment, the quantum processor can be a hardware quantum processor (e.g., a hardware superconducting quantum processor) that can encode and/or process information using qubits based on the optimized quantum pulse. For instance, the quantum processor can be a hardware quantum processor that executes a set of instruction threads associated with qubits based on the optimized quantum pulse. In another embodiment, the quantum processor can be associated with a quantum simulator that can simulate execution of a set of processing threads on the quantum processor based on the optimized quantum pulse. In certain embodiments, the optimizing of the quantum pulse to generate the optimized quantum pulse can provide, for example, improved performance, efficiency and/or accuracy of the quantum processor.

Figure 7:
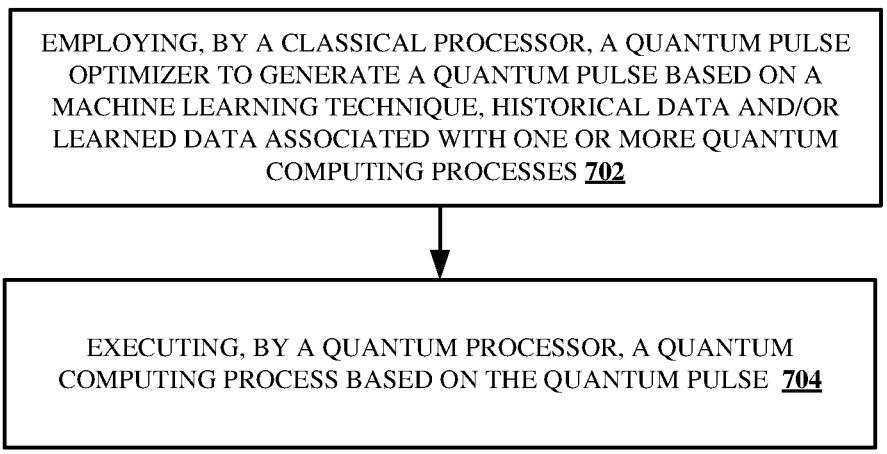
FIG. 7 illustrates a flow diagram of another example, non-limiting computer-implemented method for facilitating quantum pulse optimization using machine learning in accordance with one or more embodiments described herein.

FIG. 7 illustrates a flow diagram of an example, non-limiting computer-implemented method 700 for facilitating quantum pulse optimization using machine learning in accordance with one or more embodiments described herein. At 702, a quantum pulse optimizer is employed, by a classical processor (e.g., by classical processor 102), to generate a quantum pulse based on a machine learning technique, historical data and/or learned data associated with one or more quantum computing processes. For example, the machine learning technique can be one or more machine learning techniques to facilitate converting a quantum pulse associated with a quantum program into the optimized quantum pulse. The optimized quantum pulse can be an optimized version of a quantum pulse associated with a quantum program. For example, the optimized quantum pulse can comprise less error and/or less noise than the quantum pulse associated with the quantum program. In an embodiment, the machine learning technique can employ machine learning and/or principles of artificial intelligence to generate the optimized quantum pulse. For example, in certain embodiments, the machine learning technique can be performed based on the historical data. Additionally or alternatively, the machine learning technique can generate the learned data. In an aspect, the machine learning technique can learn one or more patterns, one or more inferences, one or more correlations, one or more features and/or information related to one or more quantum pulses and/or one or more quantum programs based on classifications, correlations, inferences and/or expressions associated with principles of artificial intelligence. The optimized quantum pulse can be, for example, an optimized microwave pulse to optimally control one or more quantum gates and/or one or more qubits of a quantum processor. For instance, the optimized quantum pulse can be an optimized electromagnetic pulse associated with a particular microwave frequency. The optimized quantum pulse can comprise, for example, a modified frequency and/or a modified phase as compared to the quantum pulse associated with the quantum program to facilitate optimized determination of an angle of rotation of a qubit state associated with a quantum processor.

The historical data can include data associated with one or more quantum computing processes (e.g., one or more previously performed quantum computing processes) performed by one or more other quantum processors. In an aspect, the historical data can include data related to one or more inputs provided to a quantum processor for one or more quantum computing processes. Additionally or alternatively, the historical data can include data related to one or more outputs provided by a quantum processor for one or more quantum computing processes. In certain embodiments, the historical data can include data related to historical qubit values of a quantum processor for one or more quantum computing processes. The historical data can additionally or alternatively include data related to one or more previously generated quantum pulses provided to a quantum processor. Additionally or alternatively, the historical data can include information related to one or more quantum programs previously executed by a quantum processor. The learned data can include data related to one or more machine learning processes performed by a classical processor. For example, the learned data can be generated based on machine learning and/or knowledge associated with the historical data. Additionally or alternatively, the learned data can include knowledge related to results generated by machine learning associated with a classical processor. Additionally or alternatively, the learned data can include knowledge related to results generated by machine learning associated with one or more quantum computations performed by a quantum processor. In an embodiment, the learned data can include one or more patterns associated with one or more previously generated quantum pulses provided to a quantum processor. Additionally or alternatively, the learned data can include one or more patterns associated with one or more quantum programs previously executed by a quantum processor. In certain embodiments, the learned data can include data related to previous optimal arrangements of quantum pulses for a quantum processor. In certain embodiments, the learned data can include a machine learning model associated with the historical data, a classical processor and/or a quantum processor. For example, in certain embodiments, the learned data can include a learning algorithm generated based on one or more previously executed machine learning processes associated with the historical data, a classical processor and/or a quantum processor.

At 704, a quantum computing process is executed, by a quantum processor (e.g., by quantum processor 104), based on the quantum pulse. For example, the quantum pulse can be provided as input for the quantum computing process executed by the quantum processor. The quantum processor can be a machine that performs a set of calculations based on principle of quantum physics. For instance, the quantum processor can perform one or more quantum computations associated with a set of quantum gates based on the quantum pulse. Furthermore, the quantum processor can encode information using qubits based on the quantum pulse. In certain embodiments, the quantum processor can perform one or more quantum computations associated with a sequence of quantum gates based on the quantum pulse. In one embodiment, the quantum processor can be a hardware quantum processor (e.g., a hardware superconducting quantum processor) that can encode and/or process information using qubits based on the quantum pulse. For instance, the quantum processor can be a hardware quantum processor that executes a set of instruction threads associated with qubits based on the quantum pulse. In another embodiment, the quantum processor can be associated with a quantum simulator that can simulate execution of a set of processing threads on the quantum processor based on the quantum pulse.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least optimizing a quantum pulse based on machine learning, etc. are established from a combination of electrical and mechanical components and circuitry, a human is unable to replicate or perform processing performed by the quantum pulse optimizer 106 (e.g., the machine learning component 204 and/or the pulse generator component 206) disclosed herein. For example, a human is unable to perform machine learning, a quantum computing process, an optimization process for a quantum pulse, etc.

Figure 8:
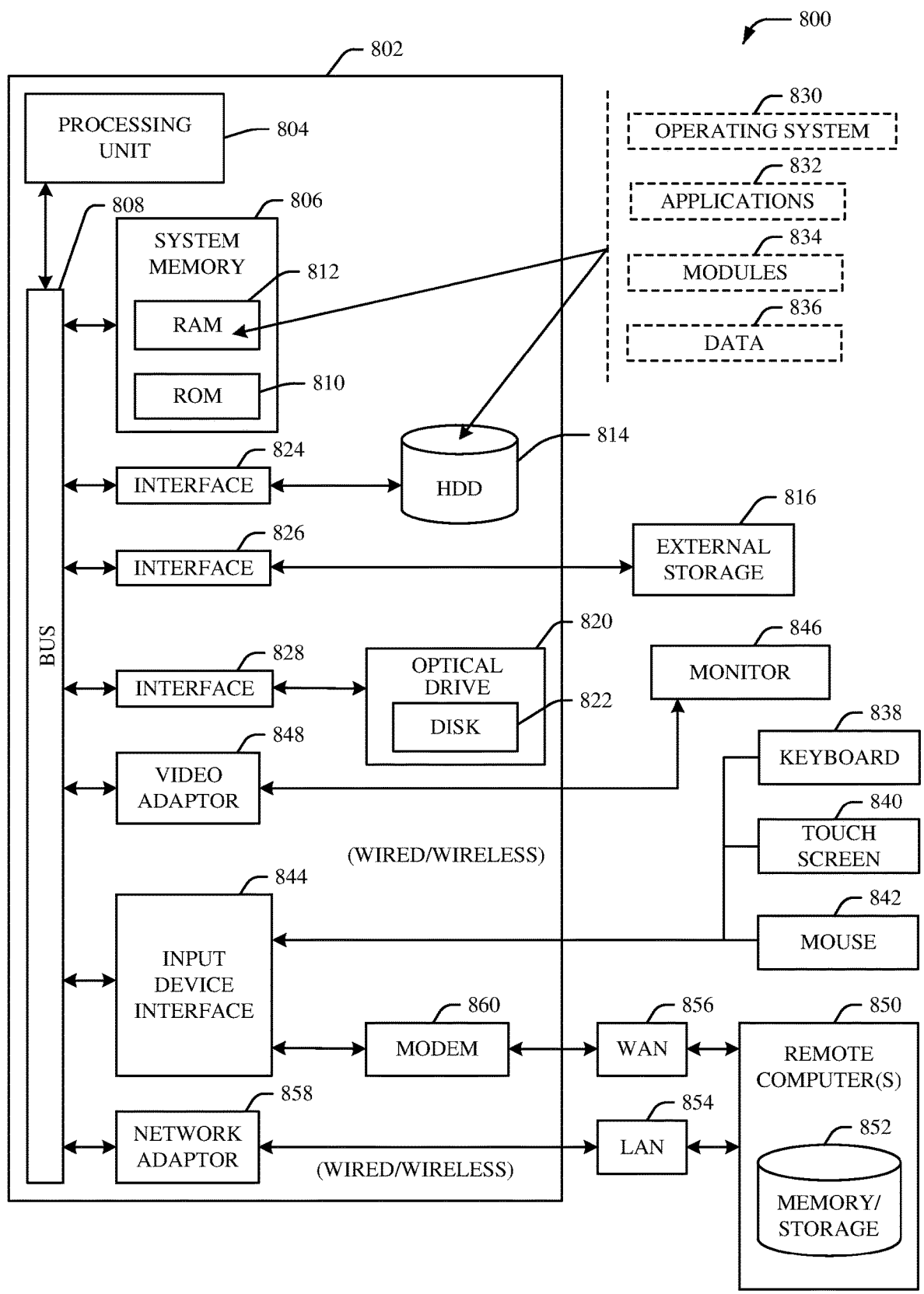
FIG. 8 illustrates a block diagram of an example, non-limiting operating environment in which one or more embodiments described herein can be facilitated.

In order to provide additional context for various embodiments described herein, FIG. 8 and the following discussion are intended to provide a general description of a suitable computing environment 800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 8, the example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and an optical disk drive 820 (e.g., which can read or write from a CD-ROM disc, a DVD, a BD, etc.). While the internal HDD 814 is illustrated as located within the computer 802, the internal HDD 814 can also be configured for external use in a suitable chassis (not shown). Additionally, while not shown in environment 800, a solid state drive (SSD) could be used in addition to, or in place of, an HDD 814. The HDD 814, external storage device(s) 816 and optical disk drive 820 can be connected to the system bus 808 by an HDD interface 824, an external storage interface 826 and an optical drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and settings for an application.

Further, computer 802 can be enable with a security module, such as a trusted processing module (TPM). For instance with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface, etc.

A monitor 846 or other type of display device can be also connected to the system bus 808 via an interface, such as a video adapter 848. In addition to the monitor 846, a computer typically includes other peripheral output devices (not shown), such as speakers, printers, etc.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 852 is illustrated. The logical connections depicted include wired/wireless connectivity to a local area network (LAN) 854 and/or larger networks, e.g., a wide area network (WAN) 856. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 or can be connected to a communications server on the WAN 856 via other means for establishing communications over the WAN 856, such as by way of the Internet. The modem 860, which can be internal or external and a wired or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link between the computers can be used.

When used in either a LAN or WAN networking environment, the computer 802 can access cloud storage systems or other network-based storage systems in addition to, or in place of, external storage devices 816 as described above. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 9:
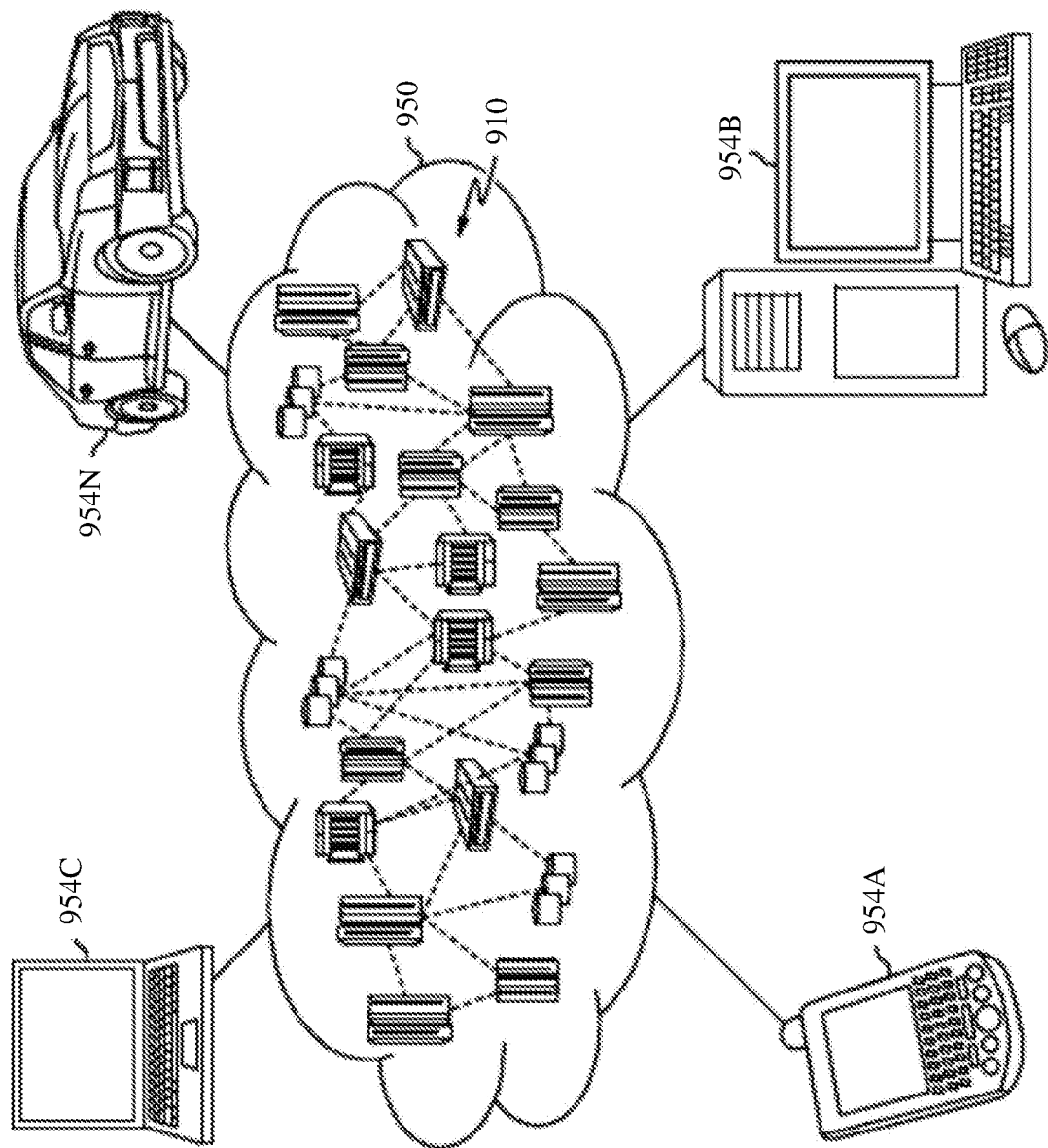
FIG. 9 illustrates a block diagram of an example, non-limiting cloud computing environment in accordance with one or more embodiments of the present invention.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
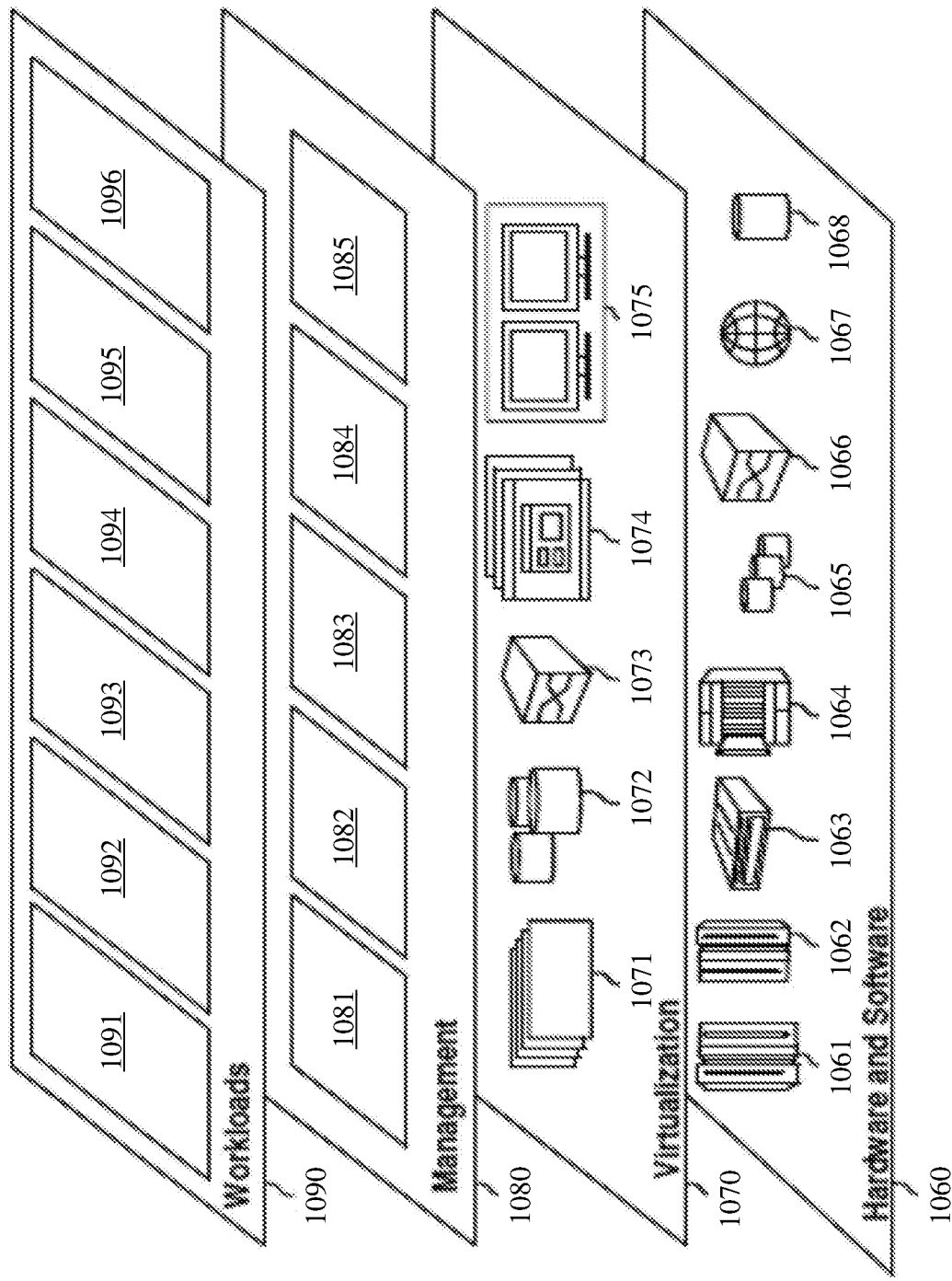
FIG. 10 illustrates a block diagram of example, non-limiting abstraction model layers in accordance with one or more embodiments of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063;

blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and quantum pulse optimizer software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a classical processor that employs a quantum pulse optimizer to generate a first quantum pulse for execution of a quantum program by employing one or more machine learning techniques based on historical data related to at least one second quantum pulse previously used in at least one previous execution of the quantum program, and further based on learned data associated with one or more quantum computing processes; and
a quantum processor that executes the quantum program based on the first quantum pulse received from the classical processor, wherein:
the historical data comprises data related to historical qubit values of the quantum processor, and data related to one or more inputs provided to the quantum processor for the one or more quantum computing processes;
the learned data is generated based on knowledge related to the historical data;
the quantum pulse optimizer optimizes the first quantum pulse according to at least one of a performance requirement for improving operations of the quantum processor including at least one of accuracy, efficiency, or efficacy of the quantum program, an amount of time to perform one or more quantum computations, an amount of processing performed by the one or more quantum computations, or an amount of storage utilized by the one or more quantum computations; and
wherein employing the first quantum pulse causes the amount of time required to perform the one or more quantum computations by the quantum processor to fall below a first defined threshold.

2. The system of claim 1, wherein the classical processor employs the quantum pulse optimizer to generate the first quantum pulse based on the learned data generated by the one or more machine learning techniques.

3. The system of claim 1, wherein the first quantum pulse is a microwave pulse that controls one or more quantum gates of the quantum processor.

4. The system of claim 1, wherein the quantum pulse optimizer generates the first quantum pulse based on one or more patterns associated with the one or more quantum computing processes.

5. The system of claim 1, wherein the quantum pulse optimizer generates the first quantum pulse based on one or more patterns related to the quantum program.

6. The system of claim 1, wherein the quantum pulse optimizer generates the first quantum pulse based on an arrangement of quantum pulses associated with the one or more quantum computing processes.

7. The system of claim 1, wherein employing the first quantum pulse further causes accuracy of the one or more quantum computations performed by the quantum processor to fall above a second defined threshold.

8. A computer-implemented method, comprising:
generating, by a system operatively coupled to a processor, a first quantum pulse for execution of a quantum program, wherein the generating comprises employing, one or more machine learning techniques based on historical data related to at least one second quantum pulse previously used in at least one previous execution of the quantum program, and further based on learned data associated with one or more quantum computing processes; and
transmitting, by the system, the first quantum pulse to a quantum processor, wherein:
the historical data comprises data related to historical qubit values of the quantum processor, and data related to one or more inputs provided to the quantum processor for the one or more quantum computing processes;
the learned data is generated based on knowledge related to the historical data;
the first quantum pulse is optimized according to at least one of a performance requirement for improving operations of the quantum processor including at least one of accuracy, efficiency, or efficacy of the quantum program, an amount of time to perform one or more quantum computations, an amount of processing performed by the one or more quantum computations, or an amount of storage utilized by the one or more quantum computations; and
the quantum processor employs the first quantum pulse to execute the quantum program such that the amount of time required to perform the one or more quantum computations by the quantum processor falls below a first defined threshold.

9. The computer-implemented method of claim 8, wherein the generating further comprises generating the first quantum pulse based on one or more patterns associated with the one or more quantum computing processes.

10. The computer-implemented method of claim 8, wherein the generating further comprises generating the first quantum pulse based on one or more patterns related to the quantum program.

11. The computer-implemented method of claim 8, wherein the generating further comprises generating the first quantum pulse based on an arrangement of quantum pulses associated with the one or more quantum computing processes.

12. The computer-implemented method of claim 8, wherein employing the first quantum pulse further causes accuracy of the one or more quantum computations performed by one the quantum processor to fall above a second defined threshold.

13. The computer-implemented method of claim 8, wherein the first quantum pulse is a microwave pulse that controls one or more quantum gates of the quantum processor.

14. The computer-implemented method of claim 8, wherein the first quantum pulse is generated using a quantum pulse optimizer.

15. A computer program product for facilitating quantum pulse optimization using machine learning, the computer program product comprising a computer readable storage medium having program instructions embodied therewith, the program instructions executable by a processor to cause the processor to:

generate, by the processor, a first quantum pulse for execution of a quantum program by employing one or more machine learning techniques based on historical data related to at least one second quantum pulse previously used in at least one previous execution of the quantum program, and further based on learned data associated with one or more quantum computing processes; and transmit, by the processor, the first quantum pulse to a quantum processor, wherein:

the historical data comprises data related to historical qubit values of the quantum processor, and data related to one or more inputs provided to the quantum processor for the one or more quantum computing processes;

the learned data is generated based on knowledge related to the historical data;

the first quantum pulse is optimized according to at least one of a performance requirement for improving operations of the quantum processor including at least one of accuracy, efficiency, or efficacy of the quantum program, an amount of time to perform one or more quantum computations, an amount of processing performed by the one or more quantum computations, or an amount of storage utilized by the one or more quantum computations; and the quantum processor employs the first quantum pulse to execute the quantum program such that the amount of time required to perform the one or more quantum computations by the quantum processor falls below a first defined threshold.

16. The computer program product of claim 15, wherein the program instructions are further executable by the processor to cause the processor to:

generate, by the processor, the first quantum pulse based on one or more patterns associated with the one or more quantum computing processes.

17. The computer program product of claim 15, wherein the program instructions are further executable by the processor to cause the processor to:

generate, by the processor, the first quantum pulse based on an arrangement of quantum pulses associated with the one or more quantum computing processes.

18. The computer program product of claim 15, wherein the program instructions are further executable by the processor to cause the processor to:

generate, by the processor, the first quantum pulse based on one or more patterns associated with the quantum program related to the first quantum pulse.

19. The computer program product of claim 15, wherein the first quantum pulse is a microwave pulse that controls one or more quantum gates of the quantum processor.

20. The computer program product of claim 15, wherein the first quantum pulse is generated using a quantum pulse optimizer.

* * * * *